May 13, 1952
S. O. DORST
2,596,134
MEANS AND METHOD FOR EFFECTING
END SEALS FOR CONDENSERS
Filed Oct. 22, 1946
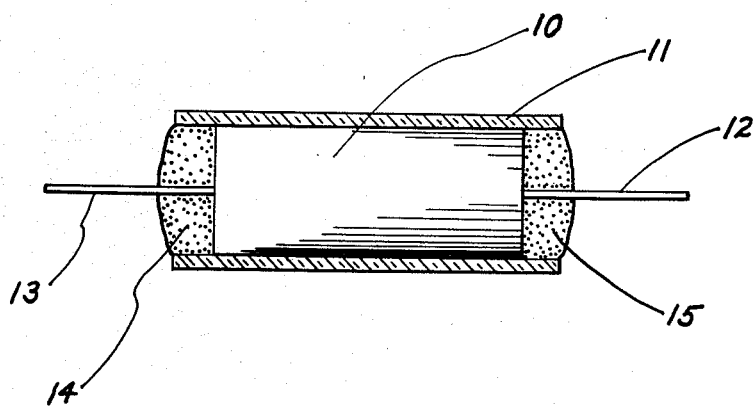
STANLEY O. DORST
INVENTOR
BY
ATTORNEY Patented May 13, 1952

2,596,134

UNITED STATES PATENT OFFICE 2,596,134

MEANS AND METHOD FOR EFFECTING END SEALS FOR CONDENSERS

Stanley O. Dorst, North Adams, Mass., assignor to Sprague Electric Company, North Adams, Mass., a corporation of Massachusetts Application October 22, 1946, Serial No. 704,824

3 Claims. (Cl. 174—76)

This invention relates to improved sealing cements for electrical devices and more specifically refers to cements especially adapted for sealing electrical condensers.

Cements have been used widely to seal various electrical devices from corrosive atmospheres, moisture, etc. Many types have been proposed for such purposes. Among these are the synthetic resins such as phenol-formaldehyde resins and the high melting point waxes with suitable inorganic fillers.

Unfortunately, however, it has not been possible to produce sealing cements which are wholly satisfactory for sealing end closures on electrical condensers and related devices. It is difficult to control the curing of the phenol resins without excessive bubbling during the removal of solvent and curing of the resin. The filled wax type end seals are very viscous at the application temperature, very brittle at normal temperatures, and they soften and flow at elevated temperatures encountered during subsequent operation of the electrical device.

It is an object of this invention to overcome the disadvantages of the foregoing and other prior art cements. It is a further object to produce a new and improved moisture-resistant cement which will not soften or flow at elevated temperatures. A still further object is to produce a sealing cement which will adhere to metal, ceramic and cellulosic materials. Additional objects will become apparent from a consideration of the following description and claims.

These objects are attained in accordance with the present invention which comprises a sealing cement made from a non-hydrolyzable refractory material and a thermosetting resin, the pores of said cement being filled with a moisture-resistant wax. In a more restricted sense, the invention is concerned with a cement seal for electrical devices comprising a porous cement containing from about 70% to about 90% non-hydrolyzable refractory material, preferably silica, and from about 30% to about 10% of a melamine-formaldehyde condensation resin, the pores of which are filled with a chlorinated aromatic hydrocarbon wax. In its preferred embodiment, the invention is concerned with a cement end seal for electrical condensers comprising a porous cement containing about 82.6% silica and about 17.4% of a melamine-formaldehyde resin, the pores of which are substantially completely filled with a chlorinated naphthalene wax. The invention is also concerned with an electrical condenser employing the cement described herein as well as with the processes for producing electrical condensers using the novel cements of the invention.

In my earlier application, Serial No. 576,074, filed on February 3, 1945, now abandoned, of which the present application is a continuation in part, I produced a cement containing non-hydrolyzable, refractory inorganic filling materials such as silica, ground mica, steatite, etc., which do not react with water to give electrolytes and, further, with the above materials I incorporate resinous binding materials which also do not react with water to give electrolytes. The final constituents of the cured cement described thus do not possess materials capable of ionization or electrolysis. The cement thus produced is ideal for electrical resistors which are extremely sensitive to the presence of electrolytes commonly introduced when water contacts the cement.

According to the present invention, I have found that the sealing cement described above may be greatly improved and particularly adapted as a sealing cement for electrical condensers and related devices which are extremely sensitive to moisture per se. This improvement is accomplished by filling the pores of the cement with a moisture-resistant wax or oil, preferably a high-melting wax. It is advisable to fill the pores of the cement by means of vacuum impregnation.

For the first step in the preparation of the sealing cement I preferably employ a melamine-formaldehyde resin in an amount varying from about 10% to about 30% by weight of the total solids, in conjunction with from about 90% to about 70% by weight of the inorganic filler. These percentages are based on the composition of the porous cement before impregnation with wax or oil. Actually the porosity will vary from about 10% to about 30% of the total volume of the cement after the original baking and cure. Various coloring materials, preferably non-hydrolyzing, may be added to improve the appearance of the cement without deleteriously affecting the physical or electrical properties. Burnt umber, for example, is a suitable inorganic coloring material while in the organic category of non-conducting, non-hydrolyzing coloring materials are the copper phthalocyanines and chlorinated derivatives thereof.

The cements of this invention are advisably applied to the condenser from a solution or suspension which facilitates handling. The liquid is removed during the baking or curing operation. While water is a specific example of a solvent, I have found that water-soluble solvents may be employed, among which are glycol, dioxane and mixtures of these with water. It will be apparent that a large variety of solvents or dispersing agents may be employed to dissolve or suspend the resin before application to the condenser.

After air-drying the cement the solvent may be removed and any additional curing of the resin accomplished by heating the unit at elevated temperatures for the desired time. The resultant cement will be a somewhat porous, hard and tough solid which will adhere to metals, ceramics, plastics generally, and cellulosic materials. Following the baking step, and in accordance with one of the preferred embodiments of the invention, the cement may be vacuum-dried and impregnated with a moisture-resistant wax which completely fills the pores of the cement and in some cases any pores in the electrical unit itself. The wax employed for this purpose may be a micro-crystalline, hydrocarbon wax or a polar wax such as chlorinated napthalene. Alternately an oil, preferably hydrocarbon in nature, may be used although the results obtained thereby are not as satisfactory, since the oil sometimes will tend to bleed out of the pores of the cement.

After impregnation with molten wax and subsequent cooling, the cement will still be hard and tough and will also be substantially impervious to moisture.

Reference is made to the appended drawing, in which a cross-section of an electrical condenser employing the sealing cement of the invention is shown. More specifically, 10 is a convolutely wound condenser section made up of electrodes separated by paper spacers with terminal wires 12 and 13 connected to electrode foils of opposite polarity. The condenser section is disposed in a casing 11, which generally conforms to the confiuration of the condenser section 10. This casing is preferably a substantially non-porous material, so as to prevent the passage of moisture through the casing. The material may be of metal, such as terneplate; ceramic, such as glass or steatite; resin, such as a phenol-formaldehyde condensation product; or it may be a resin-treated paper. Since the cement disclosed herein adheres to any of the above materials, the selection may be based on other factors, such as cost, insulating properties, etc.

Sealing the end-closures and surrounding terminal wires 12 and 13, are cement layers 14 and 15. A typical cement composition and processing arrangement is as follows:

The cement is applied as the following mixture:

| | Parts |
|---|---|
| Silica (ground) | 1000 |
| Melamine-formaldehyde resin (ground) | 200 |
| Water | 190 |
| Burnt umber | 40 |

The pasty mixture was applied to the end-closures with a spatula and the units were then air-dried for 15 hours. Thereafter, the cement was baked at 85° C. to complete solvent removal. The unit was then placed in a drying tank and residual moisture in the condenser section and the end seals removed under a high vacuum. While vacuum was maintained, a molten chlorinated naphthalene was (M. P. 95° C.) was introduced into the tank and allowed to cover the condenser assemblies. The vacuum was then broken and the units allowed to stand under the molten wax at atmospheric pressure. The wax thus impregnated the pores of the end seal, as well as the pores and openings in the condenser section per se. Upon removal from the tank and subsequent cooling, the finished units were surprisingly resistant to high humidities and even to temperatures in excess of the melting point of the impregnating wax, since the relation between the size of the pores and the surface tension of the molten wax prevents free flowing of the wax from the condenser and end seal.

While the sealing cement of the invention has been described particularly in connection with electrical condensers, especially of the paper spacer type, it is equally useful as an insulating, moisture-resistant seal for other electrical devices, such as resistors, coils generally, transformers, etc.

The final composition of the cured cement described above is as follows:

70 per cent silica
14 per cent melamine-formaldehyde resin
2.8 per cent burnt umber
13.2 per cent wax It can be appreciated that the cements of this invention possess the advantages of both the silica-filled resin cement, disclosed in my parent application, and a wax seal, without being subject to the disadvantages of either. Further, it has not been heretofore possible to prepare such a novel cement since the wax and inorganic filler do not form a stable suspension when mixed together, in the absence of resins.

As many apparently widely different embodiments of this invention may be made without departing from the spirit and scope hereof, it is to be understood that the invention is not limited to the specific embodiments hereof except as defined in the appended claims.

What I claim is:

1. A method of forming a moisture-proof, insulating seal between a condenser casing and a condenser terminal extending through an opening in said casing, which method comprises mechanically filling the entire space between the casing and the terminal wire adjacent to such opening with a paste from 60% to 80% by weight of finely divided non-hydrolyzable refractory ceramic material, from 10% to 20% by weight of an incompletely cured melamine-formaldehyde resin and from 10% to 20% by weight of a volatilizable dispersing agent, baking the resultant assembly to volatilize and remove the dispersing agent from the paste, cure the resin therein and form a hard, uniformly porous seal, vacuum-impregnating the pores of said seal with a molten moisture-resistant wax, and cooling said assembly.

2. A method of simultaneously impregnating and sealing a condenser comprising an unimpregnated convolutely wound condenser section mounted within a tubular casing and having at least one terminal wire extending from said condenser through an end of said casing, which method comprises mechanically filling the entire space between said open ends of the casing and the terminal wire extending therethrough with a paste of from 60% to 80% by weight of finely divided non-hydrolyzable ceramic material, from 10% to 20% by weight of an incompletely cured melamine-formaldehyde resin and from 10% to 20% of a volatilizable dispersing agent of the class consisting of water and water-soluble organic solvents, baking the resultant assembly to volatilize and remove the dispersing agent from the paste, cure the resin therein and form a hard, uniformly porous seal, vacuum-impregnating the entire assembly with a molten, chlorinated aromatic hydrocarbon wax, to fill with this wax all voids within the condenser and all pores within the seals, and cooling said assembly.

3. An electrical condenser assembly comprising an electrical condenser mounted within a casing, a terminal wire extending from said condenser through an opening in said casing, and a moisture-proof, insulating seal filling the space between the casing and the terminal wire, said seal being a hard, uniformly porous product resulting from the heat-curing of a mixture of from about 60% to about 80% by weight of finely divided refractory ceramic material and from about 10% to about 20% by weight of a water dispersable melamine-formaldehyde resin the balance of said mixture being evaporatable dispersing agent, the cured hard product having from about 70% to about 90% by weight of said refractory ceramic material bonded with about 10% to about 30% by weight of the cured resin, and the pores of said product being filled with a moisture-resistant wax.

STANLEY O. DORST.

REFERENCES CITED

The following references are of record in the file of this patent:

UNITED STATES PATENTS

| Number | Name | Date |
|---|---|---|
| 1,239,273 | Hurt | Sept. 4, 1917 |
| 1,816,194 | Power | July 28, 1931 |
| 2,181,695 | Given | Nov. 28, 1939 |
| 2,327,738 | Perry | Aug. 24, 1943 |
| 2,377,868 | D'Alelio | June 12, 1945 |
| 2,421,652 | Robinson et al. | June 3, 1947 |
| 2,444,880 | Robinson | July 6, 1948 |